Dec. 1, 1964 E. H. WEISSENBERG 3,159,371
SUPPORT WITH DISPLACEABLE ELEMENTS
Filed Oct. 8, 1962 4 Sheets-Sheet 1
FIG. 1.
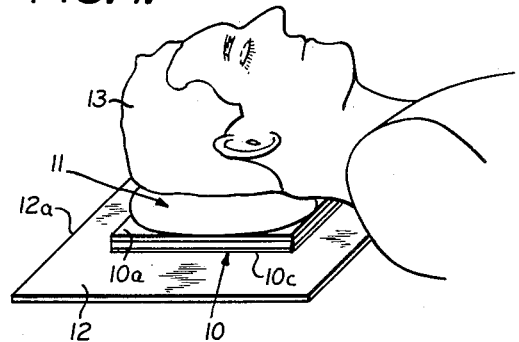
FIG. 3.
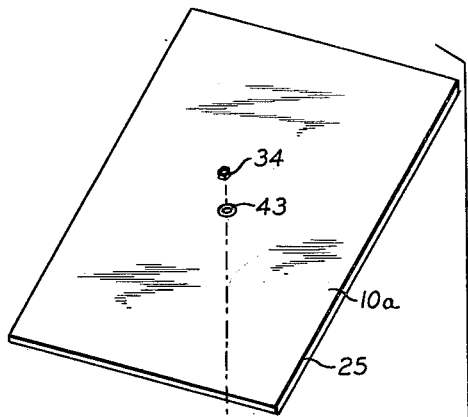
FIG. 2.
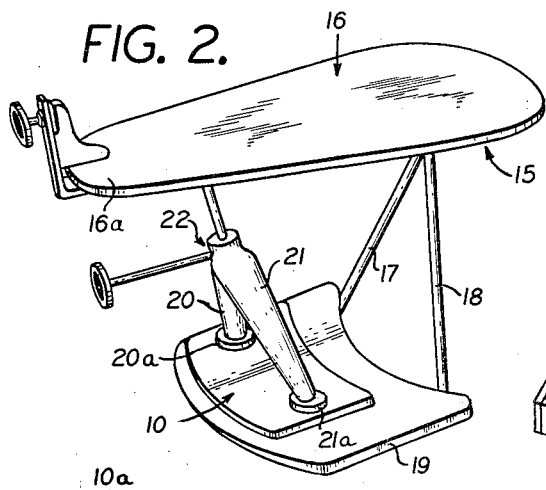
FIG. 4.
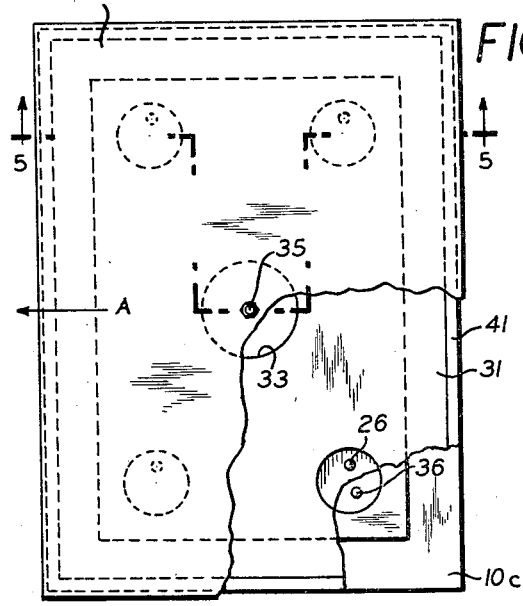
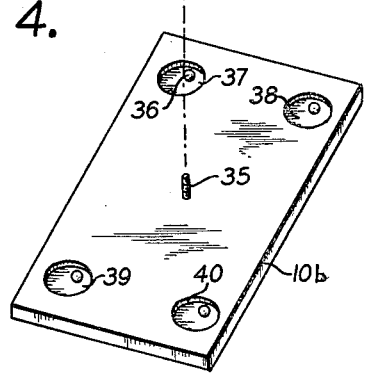
INVENTOR
EUGENE HENRY WEISSENBERG
BY *McGlew and Toren*
ATTORNEYS.

INVENTOR
EUGENE HENRY WEISSENBERG
BY
ATTORNEYS.

Dec. 1, 1964     E. H. WEISSENBERG     3,159,371
SUPPORT WITH DISPLACEABLE ELEMENTS
Filed Oct. 8, 1962                                       4 Sheets-Sheet 3
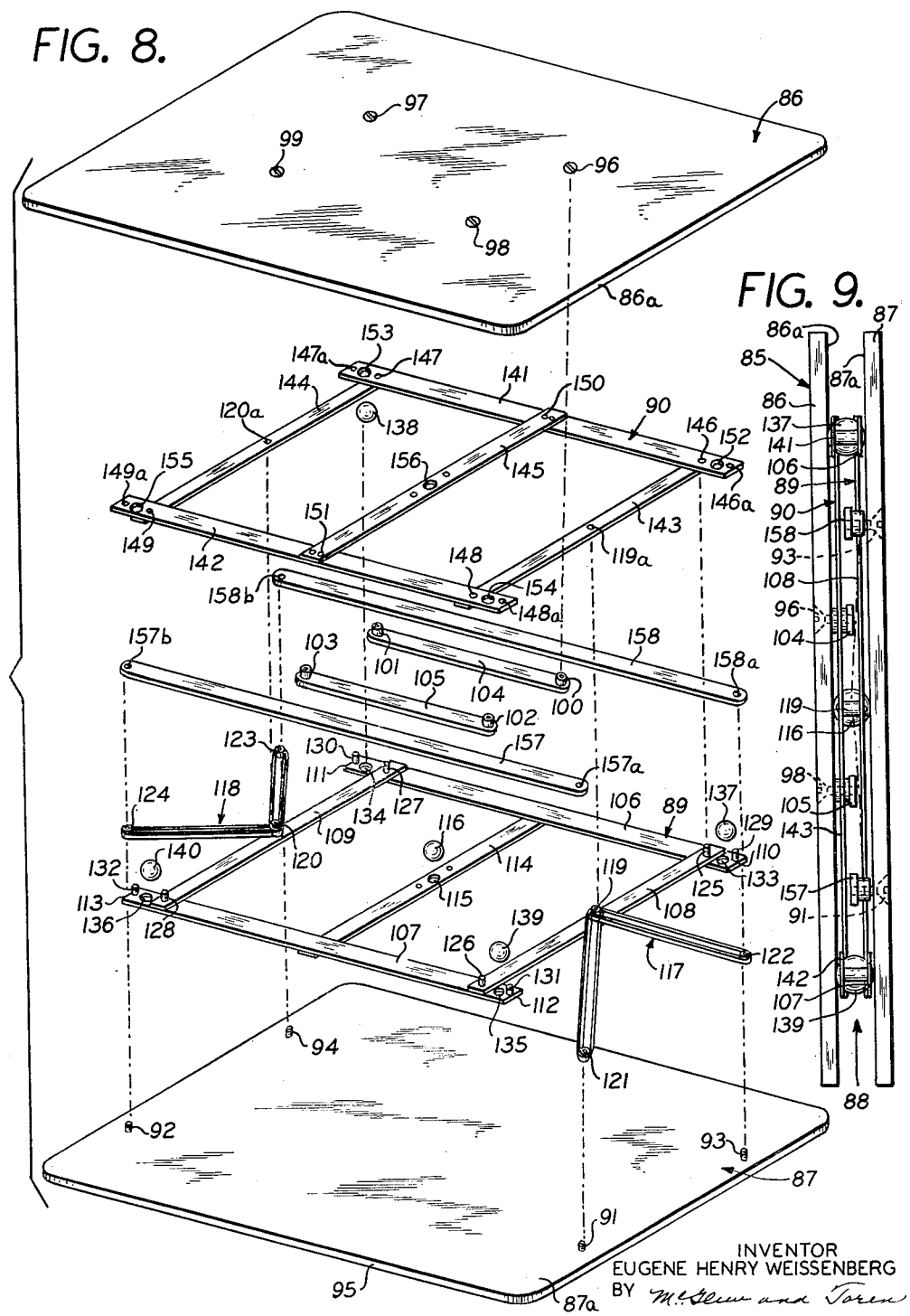
INVENTOR
EUGENE HENRY WEISSENBERG
BY
ATTORNEYS.

Dec. 1, 1964   E. H. WEISSENBERG   3,159,371
SUPPORT WITH DISPLACEABLE ELEMENTS
Filed Oct. 8, 1962   4 Sheets-Sheet 4
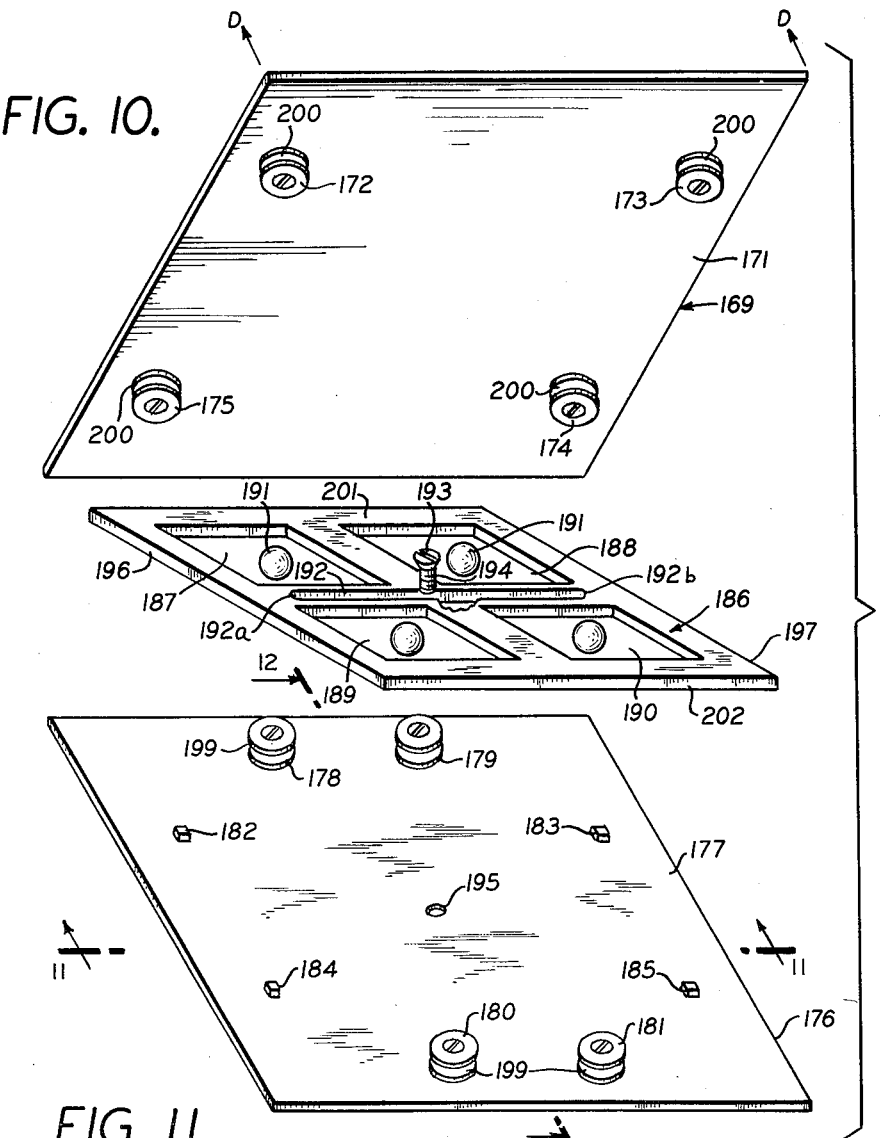
FIG. 10.
FIG. 11.
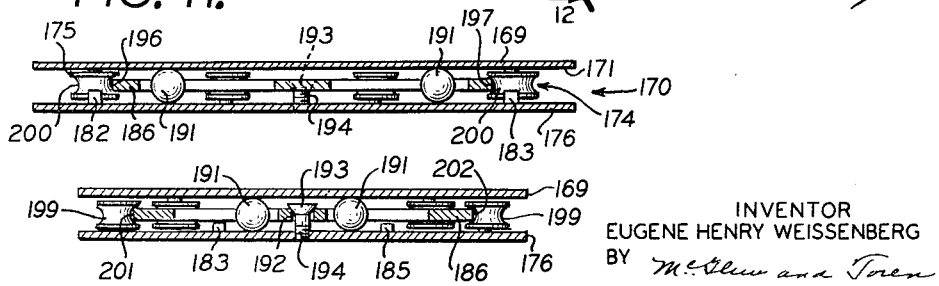
FIG. 12.
INVENTOR
EUGENE HENRY WEISSENBERG
BY McGlew and Toren
ATTORNEYS.

United States Patent Office 3,159,371
Patented Dec. 1, 1964

3,159,371
SUPPORT WITH DISPLACEABLE ELEMENTS
Eugene Henry Weissenberg, 206 Flamboyanes Ave.,
Hyde Park, Rio Piedras, San Juan, Puerto Rico
Filed Oct. 8, 1962, Ser. No. 229,093
12 Claims. (Cl. 248—346)

This invention relates generally to support means for use in connection with a variety of devices, such as therapeutic treatment, advertising and other industrial apparatus.

It is one of the important objects of the invention to provide means resulting in an efficacious and relatively simple supporting device, whose movable parts operate substantially noiselessly and smoothly and with a minimum of friction between such parts, so that only very small forces suffice to produce relative large motions of one or more parts to the remaining or base part.

It is another object of the invention to provide means offering the possibility of imparting to the supporting device predetermined traction force and in a selected direction which, if desired, may be primarily caused by the weight of the supported object or part of it.

Still another object of the invention resides in the provision of means conducive to a highly economical, inexpensive and substantially automatic support structure which requires only a few vital elements and can readily be stored away when not in use.

Yet another object of the present invention is to provide means affording a greatly simplified construction of a supporting device, whose elements perform rollable, gliding or like movements which will not be impeded by the presence of dust particles and like foreign matter and whose movable parts may be locked or confined in predetermined position, when not in use.

It is a further object of the present invention to provide means imparting a motion to one or more parts of the novel support device either manually, by application of a power drive or by means of gravity, respectively, whereby said motion may be performed along a predetermined and controlled path or may occur randomly, if desired.

It is still another object of the invention to provide means facilitating the construction of a composite rolling support, parts of which carrying out relative rollable and substantially planar motions of predetermined magnitude, which may be preset by suitable fixed or adjustable stop means.

Yet another object of the invention is to provide means conducive to a highly sensitive, platform-shaped, multilayer rollable structure, whose top and base layer members may be coupled together to be displaced in unison and within defined pattern or patterns of motion relative to an intermediate or frame-shaped layer member, which retains balls or like roller elements, with which contiguous planar surfaces of said top and base members are in substantially frictionless contact, the outer surface of the top member being concave or convex in section or of any desirable shape to conform to a part of a human body, such as a head.

Still a further object of the present invention is to provide means aiming at an efficient treatment, exercising and like apparatus, by which, for example, traction or similar motion may be exerted, so that motions in at least two dimensional directions occur, which may influence muscles by stretching and invigorating the same, and by stimulating blood circulation of the human body.

These and other objects of the invention will become further apparent from the following detailed description, reference being made to the accompanying drawings, showing preferred embodiments of the invention.

In the drawings:

FIG. 1 is a fragmentary and perspective view of a head rest arrangement equipped with a support device made in accordance with the invention;

FIG. 2 shows in perspective the support device pursuant to the invention incorporated in a treatment apparatus;

FIG. 3 is an exploded view of the device of FIG. 1 with parts thereof seen in perspective;

FIG. 4 is a top plan view of the device of FIG. 3 with its parts arranged in superposed and assembled position, portions being broken away;

FIG. 8 is an exploded view of a further modification of the device embodying the invention;

FIG. 9 is a cross-sectional view of the device of FIG. 8 in assembled position;

FIG. 10 illustrates an exploded view of still another modified device pursuant to the invention, parts being partly shown in perspective;

FIG. 11 is a cross-sectional view of the device of FIG. 10 in assembled condition, the section being taken along line 11—11 of FIG. 10; and FIG. 12 is a cross-sectional view somewhat similar to that of FIG. 11, the section, however, being taken along line 12—12 of FIG. 10.

Figure 6:
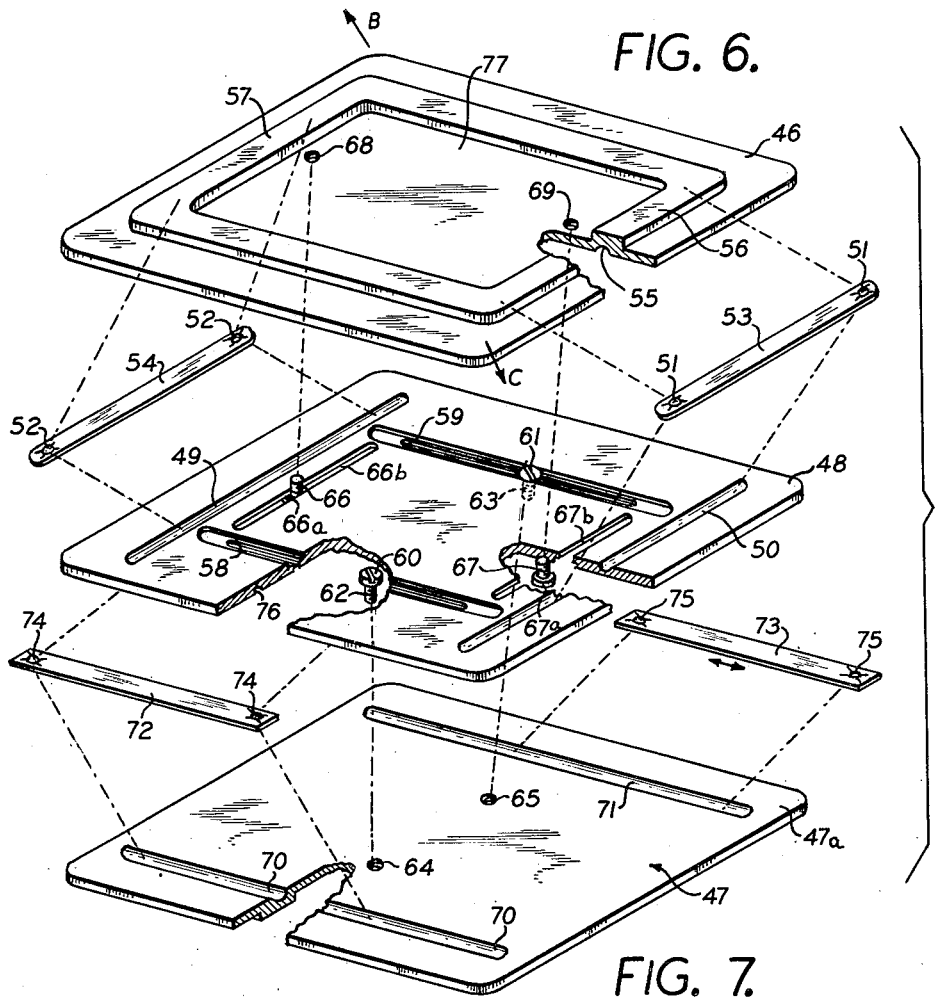
FIG. 6 is an exploded view of a modified device pursuant to the invention.

Referring now particularly to the attached drawings, there is disclosed in FIG. 1 a support device 10 pursuant to the invention. As here shown on top of said device is placed a cushion 11 or like rest located in superposed position on a base 12 of any suitable material. The head 13 of a person is lying on cushion 11 and as base 12 may be slanting somewhat downwardly toward its rearward edge 12a, it may be readily realized that the top plate 10a will slide due to gravitational and other forces toward the rear edge 12a, together with cushion 11 and head 13 and relative to the stationary or fixed base plate 10c placed on base 12 of the device.

FIG. 2 indicates the location of device 10 in connection with a treatment or exercising apparatus 15, whose main parts consist of top or rest plate 16 supported by means of front legs 17, 18 on a base or foot plate 19. Fork-shaped rear legs 20, 21 are inserted in sleeve-shaped recesses 20a, 21a which are connected to the top surface of the support device 10 embodying the invention. It will be easily understood that through suitable adjustment device 22 the legs 20, 21 may be so located that the top or rest plate 16 is somewhat inclined toward its rearward edge 16a. The apparatus of FIG. 2 with support device 10 incorporated therein may be employed for the treatment of a person in order to impart to a body part thereof a traction or rollable force as will be apparent from the further explanations and description with respect to the support device 10.

Figure 5:
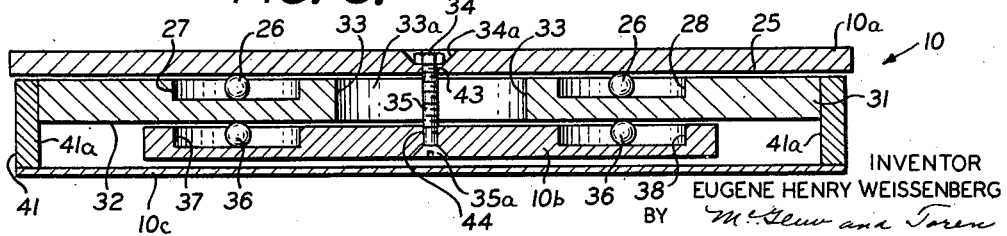
FIG. 5 is a cross-sectional view of the device taken along line 5—5 of FIG. 4.

Support device 10 is shown in exploded view with the elements somewhat in perspective. Its cover or top plate 10a has a planar underface 25 which comes to lie in contact with balls 26 confined in circular recesses 27 to 30 of intermediate plate 31. A lower or abutment plate 10b which is provided with circular recesses 37 to 40 holds balls 36 for engagement with the planar surface 32 of the intermediate plate 31, which has a rather large central opening 33a defined by wall 33 through which extends a screw bolt 35 held by a nut 34 recessed in countersunk opening 34a of top plate 10a. The head 35a of bolt 35 is countersunk in the underface of base plate 10b, as seen in FIG. 5. Screw bolt 35 extends through bores 43 and 44, respectively, of top and abutment plates as shown and forms together with wall 33 stop means for sliding movement of plate 10a in any desired direction. Intermediate plate 31, in this particular instance, is provided with a skirt portion 41 which covers lower plate 10b, which is of smaller dimension than top plate 10a. A closure or bottom plate 10c is attached to skirt 41 to cover plate 10b and the interior of the device 10.

From the foregoing disclosure, the operation of the device is immediately apparent. Top plate 10a may be displaced, e.g. in the direction of arrow A (FIG. 4), so that such top plate is sliding with planar underface 25 over ball elements 26 until bolt 35 abuts against and is stopped by wall 33 simultaneously entraining base plate 10b, which may in the embodiment shown, abut against the inner surface 41a of skirt portion 41 to limit this movement of top plate 10a. During this displacement of top plate 10a, ball elements 36 of base plate 10b are then kept in rolling engagement with planar surface 32 of intermediate plate 31. Ball elements 26 and 36 roll during displacement of plates 10a, 10b freely in their recesses 27 to 30 and 37 to 40, but over distances which are shorter than those of plates 10a, 10b as is well understood.

Besides the first stop means constituted by bolt 35 and wall 33, the walls defining recesses 27 to 30 and 37 to 40 limit the rolling movements of said balls 26, 36 or other roller means and constitute second stops, thereby providing free rotational movements around the axes of said roller means and perpendicular to the planar surfaces 25 and 32.

Figure 7:
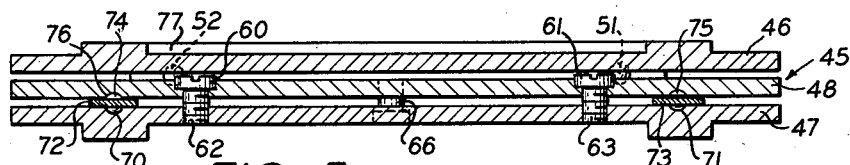
FIG. 7 is a cross-section of the device of FIG. 6 in assembled position.

Referring now to another embodiment of the invention, there is shown in FIG. 6 a multi-layer support structure in exploded view and with parts thereof seen in perspective and in section. To more clearly disclose the entire structure, a cross-section thereof in assembled condition is shown in FIG. 7.

The support device 45 has a top plate 46, a lower plate 47 and an intermediate or guide plate 48 which is coupled to top and lower plates in a specific manner to enable the top plate 46 to perform a controlled motion in a predetermined fashion. To this end, intermediate plate 48 has one pair of semi-cylindrical longitudinal grooves 49 and 50 in which are engaged roller or ball elements 51 and 52, respectively, which are retained in strips 53, 54 adapted to reciprocably slide in grooves 49, 50 lengthwise thereof. As realized from FIG. 6, ball elements, when seated in grooves 49, 50, will also engage corresponding grooves 55 provided in the underface of ledges 56, 57. Between grooves 49 and 50 and extending perpendicular thereto are slots 58, 59 in which bolt heads 60, 61 are located for sliding movement in said slots relative to base plate 47. Bolts 62, 63 are screwed at 64, 65 in respective openings provided in said plate 47. Similar bolts 66, 67 extend from intermediate plate 48 into openings 68, 69 of top plate 46, the heads 66a, 67a of said bolts slidably engaging slots 66b, 67b.

Base plate 47 is provided in its surface 47a facing intermediate plate 48 with two longitudinal grooves 70, 71 which are semi-circular in cross-section and are directed perpendicular to grooves 49, 50. The grooves 70, 71 serve to receive respective strips 72, 73 carrying pairs of ball elements 74, 75 for a similar purpose as referred to in regard to ball elements 51, 52. Ball elements 74, 75 are adapted to run in grooves 76 provided in spaced apart relation in the underface of the said intermediate plate 48.

It will be well understood that a relative and controlled movement between base plate 47 and intermediate plate 48 on the one hand and a relative and controlled movement between top plate 46 and intermediate plate 48 on the other hand may be had, which results in a slidable motion simultaneously in lengthwise and crosswise directions as indicated by arrows B and C.

As seen in FIG. 7, top plate 46 has a central recess 77 for locating therein a cushion (not shown) or similar rest, as seen in FIG. 1.

According to FIGS. 8 and 9, another embodiment of the invention is illustrated, wherein the support 85 consists of a top plate 86 and base plate 87 with a set of intermediate linked frame layers 88. Frame layers 88 consist of a base frame 89, top frame 90 and interconnecting levers, to which reference will be had later on.

Base plate 87 is provided with pairs of pins 91–92 and 93–94 which are located in opposed relation to each other, project upwardly beyond base plate 87 and are spaced a distance from edge 95 defining plate 87.

Top plate 86 is provided with pairs of openings 96–97 and 98–99 for the engagement with projections 100–101 and 102–103 of respective spacer strips or arms 104, 105 later referred to. Base frame 89 consists of two pairs of parallel and longitudinal fixed arms 106–107 and 108–109, the latter arms 108–109 preferably extending in a plane above arms 106–107 as shown, and being fixed thereto in any appropriate manner, but being spaced from their respective ends 110–111 and 112–113 as shown. An intermediate strap-like connector member 114 joins arms 106–107 in a plane therebelow and reinforces the same, as may be easily realized. Arm or connector member 114 is provided with a centrally located socket opening 115 forming a seat for a ball element 116 later referred to. Transverse frame arms 108–109 pivotally carry midway of their length crank-shaped members 117, 118 made of resilient material. These members may also form spring-like elements for a purpose later explained. Pivot pins 119, 120 facilitate oscillatory movements of members 117, 118 which carry at their free ends sleeve-shaped projections 121–122 and 123–124. Arms 108, 109 are also provided with upwardly extending projections or pins 125–126 and 127–128. Arms 106, 107 are provided near their respective outermost ends 110, 111 and 112, 113 with fixed pivot pins 129, 130 and 131, 132 and further with socket forming openings 133, 134 and 135, 136 for locating therein ball or like rollable elements 137, 138 and 139, 140.

Upper or top frame 90 is composed of lengthwise extending arms or members 141, 142 generally corresponding to arms 106, 107 of lower or base frame 89, and of crosswise extending arms 143, 144 and 145. Arms 143 and 144 are joined to arms 141 and 142 at a level therebelow, whereas centrally located arm 145 extends across and above arms 141 and 142 and is affixed to the latter at 150, 151. Near the outermost ends of arms 141 and 142, there are provided countersunk openings 152, 153, 154 and 155 adapted to engage ball or rolling elements 137, 138 and 139, 140 when upper and lower frames 89 and 90 are in superposed and assembled condition. Spacer arms or levers 104, 105 abut from below against the underface of central arm 145, and engage by means of their sleeve-shaped projections 100, 101 and 102, 103 openings 96, 97 and 98, 99 of top plate 86. Screw bolts (not shown) engage with said projections 100 to 103 to couple plate 86 with top frame 90, when support 85 is in assembled condition.

Arm 145 is further provided with a centrally located countersunk opening 156 forming a bearing part for ball or rollable element 116, which is further retained in bearing part 115.

In assembled condition of this support device 85 as shown in FIG. 9, contiguous planar surfaces of base plate 87 and of top plate 86 will be in contact with rollable elements 116, 137 to 140, which in turn are retained for free rolling action, respectively, between holders or sockets 115, 156 and 133, 152; 134, 153; 135, 154; and 136, 155.

Frame part 90 is coupled with frame part 89 upon engagement of projections 119, 120 with fitting openings 119a, 120a and further upon engagement of pins 125, 129 with openings 146, 146a, pins 127, 130 with openings 147, 147a, pins 126, 131 with openings 148, 148a and pins 128, 132 with openings 149, 149a, as may be easily realized. Consequently, when top plate 86 thus coupled to frame parts 89, 90 is displaced to base plate 87, the contiguous planar surfaces 86a, 87a may slide in desired directions relative to each other, while contact with the ball or rollable elements 116 and 137 to 140 is maintained. Resilient members 117, 118, however, will always impart to plates 86, 87 the tendency to return to their substantially coinciding superposed positions as is apparent from the sectional view of FIG. 9.

Slide bars 157, 158 are provided with respective end openings 157a, 157b and 158a, 158b into which hollow projections 121, 124 and 122, 123 extend to make sliding engagement with frame part 89. The projections 121–124 in turn are rotatably received by the aforementioned pins 91–93 and 94–92 respectively.

A further useful embodiment 170 pursuant to the invention is illustrated in FIGS. 10 to 12. As here shown, top plate 169 is provided on its planer underface 171 with guide elements 172 to 175 in the form of profiled rollers as more clearly seen in FIGS. 11 and 12. Base plate 176 is likewise provided on its planar surface 177 with spaced pairs of profiled guide roller elements 178 to 181 for a purpose later described. Furthermore, square-shaped offset pieces forming stop means 182 to 185 are arranged in the path of guide elements 172 to 175 as will be later explained. The intermediate frame plate or layer 186 is provided with square-shaped openings 187, 188, 189, 190 for retaining therein ball-shaped elements 191. Further provided in frame-shaped intermediate plate 186 is a central longitudinal slot 192 in which the head 193 of a screw bolt 194 is slidably engaged. The screw bolt 194 extends into opening 195 provided in base plate 176.

In order to assemble this support device 170, the intermediate plate 186 is brought into slidable engagement with screw bolt head 193 in place in longitudinal groove 192 and projecting with the bolt part 194 therebeyond by means of side edges 196, 197 with the median recessed part 200 of each of the profiled guide elements 172–175 of the top plate 169, which is then turned around and swung upside down together with engaged frame plate 186. The spaces 187–189 receive thereafter ball elements 191. Base plate 176 is thereafter brought into engagement with frame plate 186 by means of the recessed part 199 of each of the guide elements 178–181, whereby the planar surface 177 comes to be confronted with the opposite face of frame plate 186. Screw bolt 194 is then brought into threaded fit with opening 195 of said base plate 176.

As will be visualized from FIGS. 11 and 12, guide elements or rollers 172–175 come then to lie in the respective paths in which stop means 182–185 are provided so that top plate 169 may be moved in contact with ball elements 191 only within certain areas, in which said guide elements abut against respective corresponding guide elements 172–175. The direction of movement of plate 169 is given by the roller elements 172–175 whereas the extent of the movement is defined by said stop means 182–185. On the other hand, displacement of plate 176 is had and occurs along guide roller means 178–181 while planar plate surface 177 is in sliding contact with ball elements 191, the extent of this movement relative to plates 169 and 186 is defined by stop means 192a, 192b.

It ensues from the embodiments herein disclosed that the plate members with their respective confronting planar surfaces are at all times in contact with the ball or like elements and that these surfaces are either movable in any direction at random or positively controlled and guided, and to the extent of the locations of their respective stop means, so that the ball elements generally roll freely or in guideways along shorter distances (extent) than those travelled by the planar surfaces during movements of the respective plates of the support device.

It is to be noted that this novel support device may be applied, for example, directly to the head of a lying person, so that the head may carry out stretching or other translatory motions, for example, relative to the spine or other body part or the device may form a portion of an apparatus for exercising or for performing other tasks.

It goes without saying that the support device with its movable parts may be retained in position of non-use by any suitable and known locking or fixing means, which may, for example, be located within the space defined between skirt surface 41a and lower plate 10b, so that the latter may not be shifted or displaced (FIG. 5) when the device 10 is not in use.

It can thus be seen that there has been provided according to the invention a support or like bearing assembly comprising a plurality of plate-shaped members arranged in superposed position to each other, some of said members being provided with planar surfaces facing each other, rolling elements interposed between and in contact with said planar surfaces, first stop means forming part of one of said members and adapted to limit relative displacement of said members to each other in directions parallel to said planar surfaces, and second stop means for confining movement of said rolling elements relative to the respective planar surfaces, said second stop means being so arranged that said rolling elements may roll freely over predetermined distances shorter than those traversed by said members during said relative displacement, said first stop means being spaced sufficiently from said second stop means to avoid, during free relative displacement of said members to each other, interference with rolling movement of said rolling elements which is confined by said second stop means.

While specific embodiments of this invention have been shown and described to illustrate the application of the principles of the invention, it will be understood that the invention may be embodied otherwise without departing from such principles.

What is claimed is:

1. A support device comprising a first element having a planar surface, a second element having a planar surface, said first element being arranged for displacement in predetermined directions relative to said second element, said planar surfaces of said elements being disposed to each other in superposed position, rollable means each having an axis of rotation and a continuous, substantially circular circumference, said rollable means being substantially freely displaceable with their axes of rotation and about their circumferences over predetermined corresponding areas of said planar surfaces, and stop means located centrally of said predetermined areas of said planar surfaces and confining planar displacement of said first element relative to said second element and confining said rollable means over respective areas amounting to a fraction of the extent of planar displacement of said first element relative to said second element.

2. A support for use in connection with therapeutic and similar devices comprising a first element having a planar surface, a second element having a planar surface and arranged in superposed position to said first element and located contiguous to the first-named planar surface, rollable means interposed between said planar surfaces so that the first element may be displaced with respect to said second element via said rollable means, first stop means for limiting the planar displacement of said first element at least partially beyond said second element, and second stop means arranged on one of said planar surfaces for permitting displacement of said rollable means relative to the respective one of the planar surfaces but impeding a displacement of said rollable means to a greater extent than the displacement of said first element.

3. A support or like bearing assembly comprising a plurality of plate-shaped members arranged in superposed position to each other, some of said members being provided with planar surfaces facing each other, rolling elements interposed between and in contact with said planar surfaces, first stop means forming part of one of said members and adapted to limit relative displacement of said members to each other in directions parallel to said planar surfaces, and second stop means for confining movement of said rolling elements relative to the respective planar surfaces, said second stop means being so arranged that said rolling elements may roll freely over predetermined distances shorter than those traversed by said members during said relative displacement, said first stop means being spaced sufficiently from said second stop means to avoid, during free relative displacement of said members to each other, interference with rolling movement of said rolling elements which is confined by said second stop means.

4. A movable support comprising an assembly of parts including one or more displaceable members each having at least one planar surface and disposed in superposed position, three or more rolling elements, one or more stop means for the displaceable members, one or more stop devices for the rolling elements, one or more locking devices and one or more spring-like devices, all these parts of the assembly being so assembled so as to allow the displaceable members to move with a minimum of friction freely and parallel to said planar surfaces in all directions within limits determined by said displaceable members' stop devices and to allow the rolling elements to move freely within limits determined by their respective stop devices, said rolling elements traveling shorter distances than the displaceable members, whereas, the locking devices prevent any part of the assembly from becoming displaced or lost during the operation performed by the device, said spring-like devices returning the displaceable members always to preselected position, whenever the support is not in use.

5. A slidable support and like base comprising first and second plate-shaped members arranged in superposed position to each other, said first and second plate-shaped members being provided with respective planar surfaces, a third plate-shaped member located contiguous to said planar surfaces of said first and second members and provided with spaced apart openings, rollable elements, one element located in a respective opening, each of said openings defining an area for rolling displacement of a respective one of said rollable elements between said planar surfaces of said first and second members, the diameter of each rollable element being sufficiently large, so that when said first and second members confront said elements the latter project beyond the walls defining said openings of said third plate-shaped member and maintain contact with said planar surfaces, so that said planar surfaces of said first and second plate-shaped members may be moved a predetermined distance relative to said elements and substantially without friction and without causing any noise, said predetermined distance being larger than the distance traveled by said elements on the respective areas during rolling displacement, first stop means for limiting movement of said first and second plate-shaped members, and second stop means for limiting displacement of said rollable elements.

6. A slidable support according to claim 5, said first stop means including a part coupling of said one plate-shaped members to an associated plate-shaped member for moving the same in unison.

7. In a slidable support having plate-shaped members arranged in superposed position to each other; one or more of said plate-shaped members being each provided with a planar surface, at least one other of said plate-shaped members being provided with spaced apart recesses, rollable elements, said elements being located in said recesses, respectively, the diameter of each rollable element being sufficiently large so that when the planar surfaces of respective members confront said elements in assembled and superposed position said elements make contact with said planar surface, means joining one of said plate-shaped members to an adjacent plate-shaped member, first stop means for limiting movement of one plate-shaped member to the adjacent one, and second stop means for limiting displacement of said rollable elements in said recesses.

8. A movable support comprising an assembly of at least two members arranged in superposed position and having contiguous planar surfaces, rolling means interposed between said surfaces, first stop means for limiting the movements of the said members relative to one another, and second stop means for limiting the movements of the said rolling means, said assembly being so constructed as to allow within the limits of the first stop means displacements of one member with respect to another in predetermined directions parallel to the said planar surfaces of the members while the rolling means roll over distances shorter than those travelled by the relative displacements of the members.

9. A portable supporting appliance comprising a plurality of superpositioned substantially flat members, the uppermost and the lowermost members being plate-shaped and each provided with a planar surface, the planar surfaces of said plate-shaped members being displaceable and confronting each other, rollable means in contact with said planar surfaces, respectively, frame-shaped means located intermediate said planar surfaces and associated with a respective one of said plate-shaped members, said rollable means being disposed for movement in respective stalls provided in and defined by said frame-shaped means, guide means forming at least part of said frame-shaped means for facilitating movement of said plate-shaped members with respect to each other, and stop means for limiting said movement of said plate-shaped members with respect to the movement of said rollable means.

10. An appliance according to claim 9, said guide means being in the form of springy arms for retracting said members to superposed position.

11. An appliance according to claim 9, said guide means being in the form of guide edges, and respective grooved guide rolls arranged on said planar surfaces of said plate-shaped members for sliding engagement with said guide edges, respectively.

12. A movable support comprising an assembly of two or more elements in superposed position with contiguous planar surfaces, rolling means interposed between them, first stop devices to limit the relative movements of the said two or more elements relative to one another, and second stop devices to limit the movements of said rolling means, the whole assembler being so constructed as to allow within the limits of the first stop devices free displacements of one element with respect to another along all directions parallel to the said planar surfaces of the elements, free rotation being provided around axes perpendicular to these surfaces, while the rolling means roll freely along distances shorter than those covered by the relative displacements of the said elements, the rolling being confined only by the second stop devices which are all sufficiently far away from the first stop devices so as not to interfere with the free relative movements of the elements relative to the said first stop devices.

References Cited in the file of this patent
UNITED STATES PATENTS
3,010,363     Malfeld _____ Nov. 28, 1961